July 19, 1960

EIICHI GOTO

DIGITAL MEMORY SYSTEM 2,946,045

Filed April 20, 1956

9 Sheets-Sheet 1

INVENTOR.

E. Goto

BY Glascock Downing & Seebold

ATTORNEYS

July 19, 1960 EIICHI GOTO 2,946,045

DIGITAL MEMORY SYSTEM

Filed April 20, 1956

9 Sheets-Sheet 2

INVENTOR.
E. Goto

BY Glascock Downing & Seebold

ATTORNEYS

July 19, 1960 EIICHI GOTO 2,946,045

DIGITAL MEMORY SYSTEM

Filed April 20, 1956 9 Sheets-Sheet 3

INVENTOR.
E. Goto
BY
Glascock Downing Seebold
ATTORNEYS

July 19, 1960

EIICHI GOTO 2,946,045

DIGITAL MEMORY SYSTEM

Filed April 20, 1956

9 Sheets-Sheet 4

INVENTOR.
E. Goto
BY
Glascock Downing & Seebold
ATTORNEYS

July 19, 1960 — EIICHI GOTO — 2,946,045

DIGITAL MEMORY SYSTEM

Filed April 20, 1956 — 9 Sheets-Sheet 5

INVENTOR.
E. Goto
BY
Glascock Downing & Seebold
ATTORNEYS

July 19, 1960 | EIICHI GOTO | 2,946,045

DIGITAL MEMORY SYSTEM

Filed April 20, 1956 | 9 Sheets-Sheet 6

INVENTOR.
E. Goto
BY
Glascock Downing & Seebold
ATTORNEYS

July 19, 1960 EIICHI GOTO 2,946,045

DIGITAL MEMORY SYSTEM

Filed April 20, 1956 9 Sheets-Sheet 7

INVENTOR.
E. Goto
BY
Glascock Downing & Seebold
ATTORNEYS

July 19, 1960

EIICHI GOTO 2,946,045

DIGITAL MEMORY SYSTEM

Filed April 20, 1956

9 Sheets-Sheet 8

INVENTOR.

E. Goto

BY Glascock Downing Seebold

ATTORNEYS

July 19, 1960

EIICHI GOTO 2,946,045

DIGITAL MEMORY SYSTEM

Filed April 20, 1956

9 Sheets-Sheet 9

INVENTOR.

E. Goto

BY Glascock Downing & Seebold

ATTORNEYS

United States Patent Office 2,946,045
Patented July 19, 1960

2,946,045

DIGITAL MEMORY SYSTEM

Eiichi Goto, 1416, 4-Chome, Nakameguro, Meguro-ku, Tokyo-to, Japan

Filed Apr. 20, 1956, Ser. No. 579,573
Claims priority, application Japan Apr. 28, 1955
13 Claims. (Cl. 340—174)

The present invention relates to a memory system and more particularly to a binary digital information storage system utilizing a plurality of reactive storage elements, such as ferromagnetic inductors or ferro-electric capacitors, having a non-rectangular hysteresis loop relationship between the electro-magnetic field applied thereto and the electro-magnetic residual induction thereof, and a parametrically excited resonator connected electrically with the reactive storage elements.

In electric and electronic computers, it is necessary to provide a memory device which can reproduce (read out) the previously stored electric signals in accordance with the necessity to make calculations or to transmit said signals.

For this purpose, cathode ray tubes, magnetic recording tapes, magnetic drums, ultrasonic devices, etc. have been heretofore used, but they have various disadvantages since the period of time for the preservation of the recorded signals, accuracy of operation, operation speed and their industrial life are unfavourable.

The memory device according to the instant invention comprises a ferro-magnetic core or ferro-electric plate to be used as the nonlinear reactive element and a means capable of recording the signals by means of inducing residual magnetic or electric induction in said element and has excellent properties in connection with the period of time for the reservation of the recorded signals, operation accuracy, operation speed and industrial life.

However, in every information storage system, it is necessary to amplify the signals to be recorded and the reproduced information signals or to use the element capable of carrying out various logical operations. For said objects, hitherto, vacuum tubes, diodes, transistors, etc. have been used, but these are relatively expensive, unstable in their characters and relatively short in their lives, such disadvantages being common to all of the memory systems.

According to the memory system of the present invention, the aforementioned disadvantages can be effectively eliminated by utilizing a new and improved parametrically excited resonator element capable of amplifying the signals and carrying out logical operations.

However, the operating characteristics of the parametrically excited resonator is remarkably different from those of the vacuum tube and transistor, so that it is impractical to combine directly any one of the usual memory systems utilizing the reactive storage elements with the parametrically excited resonator.

It is a principal object of the present invention to provide a memory system utilizing reactive storage elements and parametrically excited resonators which are directly coupled with said elements.

It is also an object of the present invention to provide a digital memory system which can accurately operate without requiring reactive storage elements having hysteresis curve of strictly rectangular form.

It is a further object of the present invention to provide a digital memory system which can accurately operate even when reactive elements having relatively non-idealized rectangular hysteresis loop characteristics are employed.

It is another object of the present invention to enable perfect preservation of the recorded signals during reproduction of said signals memorized in the storage element. The previously recorded signal can be repeatedly reproduced without a regenerating process and the erasure of the previously recorded signal made effective only upon the recording of a new signal on the storage element.

A still further object of the present invention is to provide a binary digital information storage system containing long lasting, reliable, rugged, and economical storage components especially suited for high speed operations.

Other objects and many of the attendant advantages of the present invention will be more readily appreciated as the same becomes better understood by reference to the following description, taken in connection with the accompanying drawings, in which.

Figure 6:
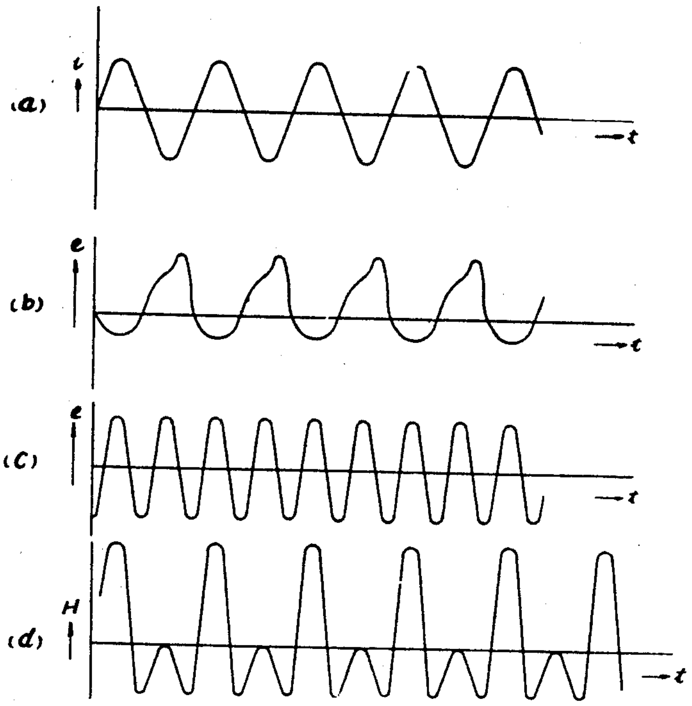

Figure 6 also shows wave forms for describing the reproducing principle of the present invention.

Figure 7:
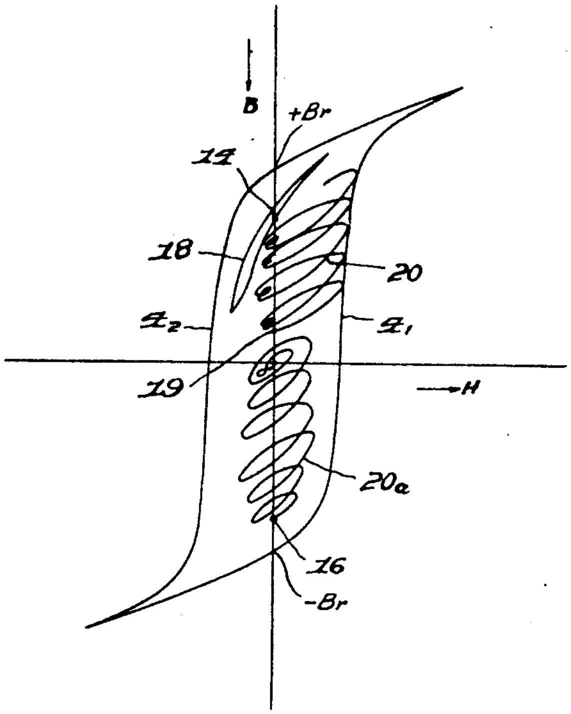

Figure 7 is B–H curve of a magnetic core for describing the operation of the recording system of the present invention.

Figure 8:
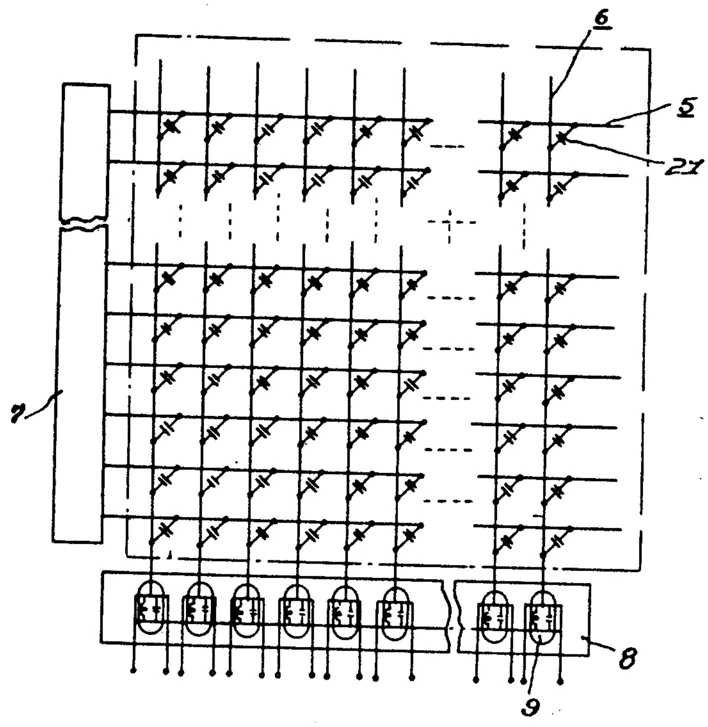

Figure 8 is a circuit diagram illustrating another example of the apparatus to which is to be applied the system of the present invention.

Figure 9:
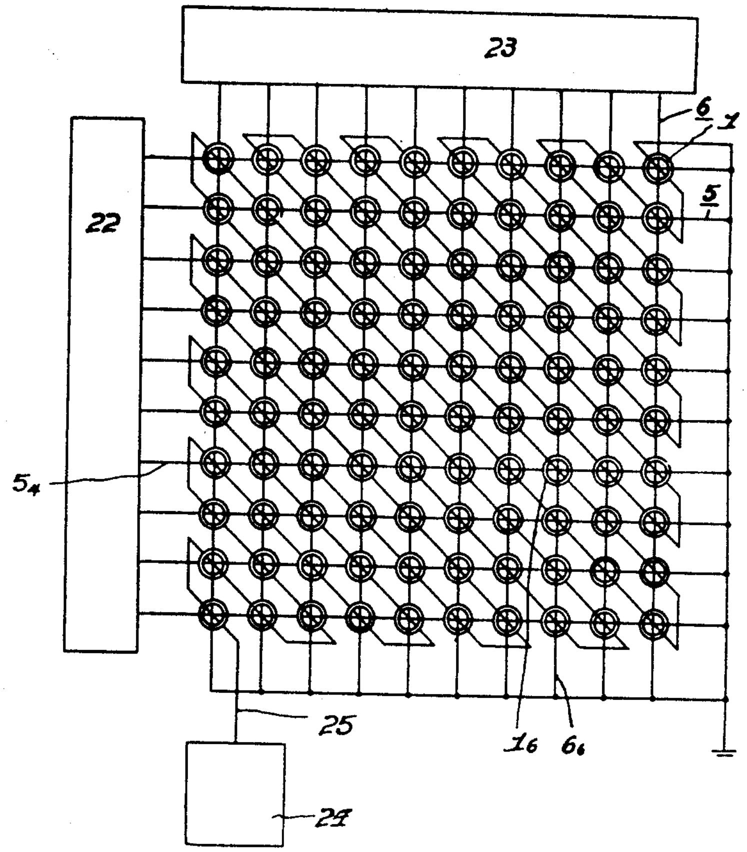

Figure 9 is a circuit diagram illustrating a still another example of the apparatus to which is to be applied the system of the present invention.

Figure 10:
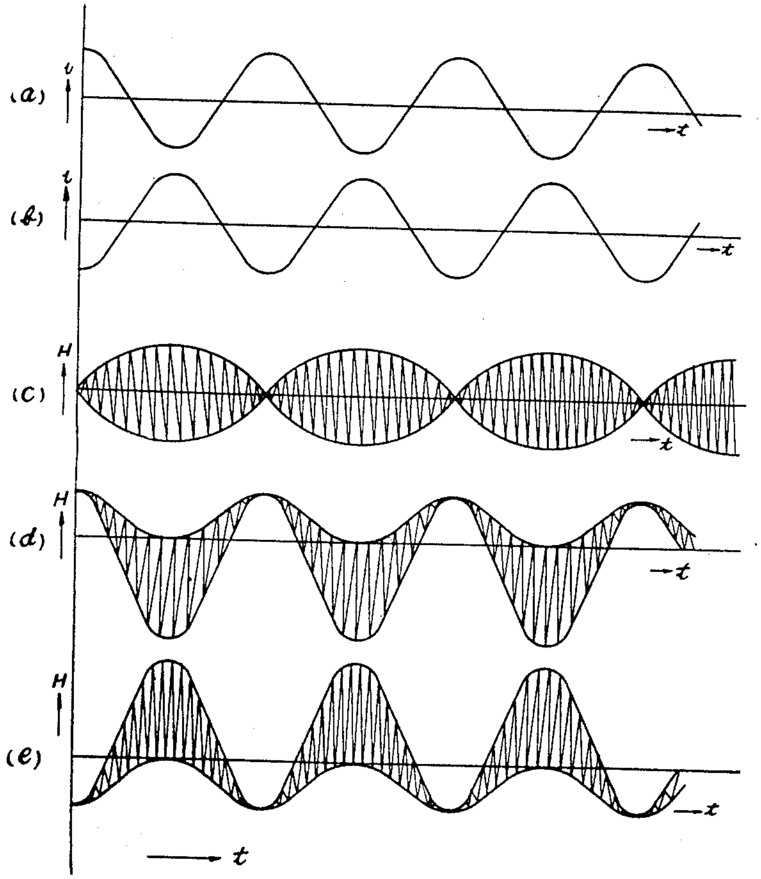

Figure 10 shows wave forms for describing the other recording principle of the system of the present invention.

Figure 11:
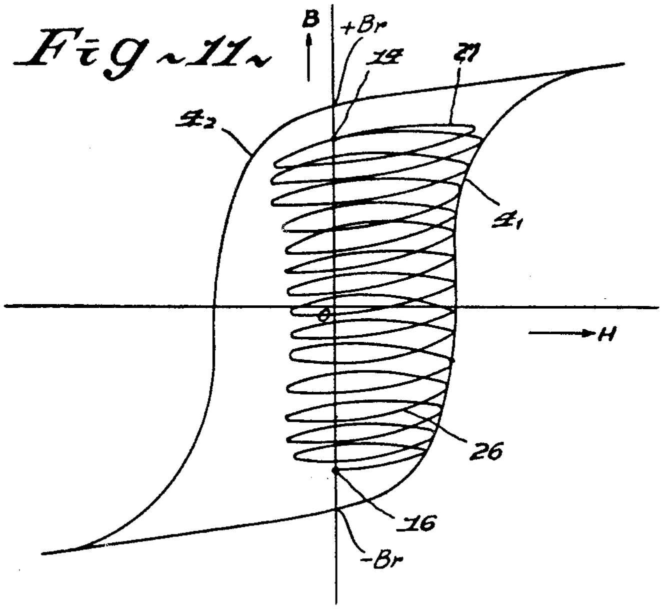
Figure 12:
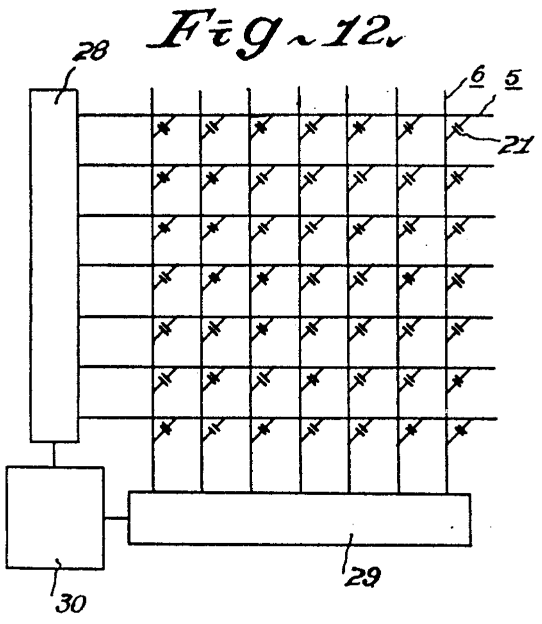

Figure 11 is a B–H curve of the magnetic core for describing the operation of the system described in Figure 10; and Figure 12 is another circuit diagram illustrating a still further example to which is applied the system of the present invention.

The parametric oscillation of any resonator or electric resonance circuit occurs when the reactance of the resonator is made to vary at a frequency $2f$, which is equal to substantially twice the resonance frequency of the resonator, ½ subharmonic oscillation having a frequency of $f$ is induced in said resonator (this phenomenon is more fully described in an article by N. W. McLachlan entitled "Ordinary Non-Linear Differential Equations," Oxford 1950). The parametrically excited resonator contemplated to be used in the instant invention is of the type disclosed in applicant's copending application Serial Number 508,668, filed May 16, 1955.

Hereinafter, the parametrically excited resonator will be denoted as the parametron and the fact that the resonance frequency of the parametron is made to vary by application of a current having a frequency $2f$ will be denoted as the fact that an exciting wave is applied to the parametron. In general, parametric oscillation of the parametron having a frequency $f$ has the property that it can oscillate at only two different phases which differ about 180° apart from each other, the two oscillations being denoted, respectively, as the 0 radian oscillation and the $\pi$ radian oscillation. It is possible to indicate one binary digit by the 0 radian oscillation or the $\pi$ radian oscillation of the parametron. In the following, let it be assumed that binary digits "0" and "1" are, respectively, represented by the 0 radian oscillation and the $\pi$ radian oscillation.

Whether the parametric oscillation becomes a 0 radian oscillation or a $\pi$ radian oscillation will be decided according to the fact that the phase of weak signal current having a frequency of and directly impressed on the resonance circuit of the parametron prior to application of exciting wave to said parametron, is 0 radian or $\pi$ radian. Accordingly, it is possible to amplify the signal current having a frequency $f$ and carrying a binary information in the form of phase difference of 180° while precisely preserving said binary information, said signal current being hereinafter referred to as the binary phase signal or the phase control signal of the parametron.

The parametron is capable of carrying out various binary logical operations besides being capable of amplifying the above-mentioned binary phase signal, but description relating to the former function is omitted in this specification, because it is not important for the description of the present invention.

Figure 2:
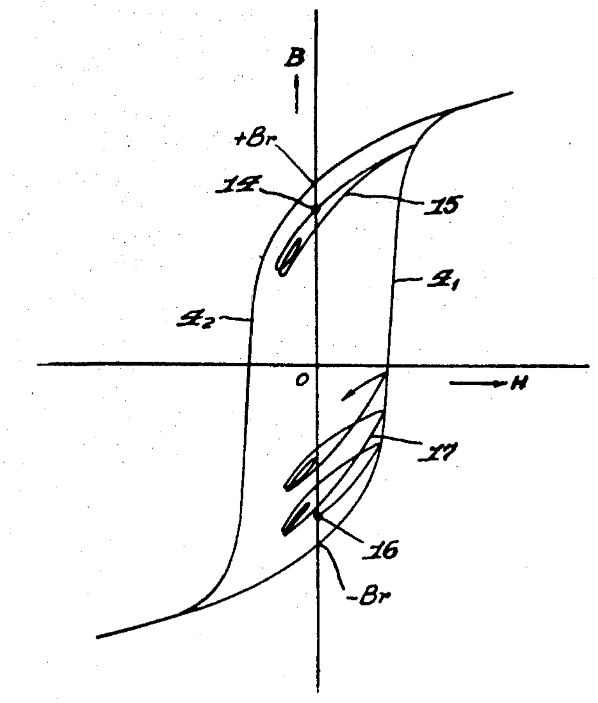
Figure 2 is a B–H curve of a magnetic core to be used for describing the operation of the recording system of the present invention.

It is well known that a reactive circuit element such as ferro-magnetic core inductor or ferro-electric capacitor having a hysteresis loop characteristic is capable of storing one bit (binary digit) of information in accordance with the magnetic or electric residual induction thereof. In general, the ferro-magnetic substance has a hysteresis loop relationship between the magnetic field H and the magnetic induction B as shown in Figure 2 and the ferro-electric substance also has a hysteresis loop characteristics similar to that of Figure 2 in which the magnetic field H is replaced by electric field E and the magnetic induction B by electric induction D, and the points $+B_r$ and $-B_r$ corresponding to the saturation conditions at positive and negative polarities, respectively.

Let it be assumed that a binary digit "1" is stored in the form of the plus polarity of the residual induction of above-mentioned reactive element, then binary digit "0" is stored in the form of minus polarity of the residual induction.

On the other hand, the parametron is capable of handling binary information in the form of phase difference of 180° (or in other words in the form of change of signal polarity).

Figure 1:
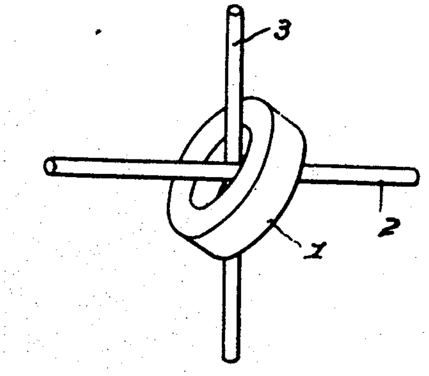
Figure 1 is a perspective view illustrating schematically a storage element of the present invention.

The illustrative signal storage element which is to be used for the system of the present invention and shown in Figure 1 is composed of a small toroidal magnetic core 1 which is made of ferro-magnetic material such as ferrite and two electrical conductors 2 and 3 which are interlinked with said core. When current or currents are passed through one or both of conductors 2 and 3, a B–H curve as shown by the curves $4_1$ and $4_2$ in Figure 2 will be obtained between the magnetic induction B and magnetic field intensity H of core. The form of said core 1 and number of the conductors which are interlinked with said core may be selected at will. Furthermore, the capacitor made by attaching electrodes on both surfaces of a ferro-electric plate made of a substance such as barium titanate can also be used as the signal storage element. Such an element also has a hysteresis characteristic between its electrostatic field intensity E applied between electrodes on both surfaces of the element and electric induction D of said ferro-electric plate.

In both of the aforementioned reactive storage elements the residual induction varies in accordance with the hysteresis loop when the applied field is varied.

Figure 3:
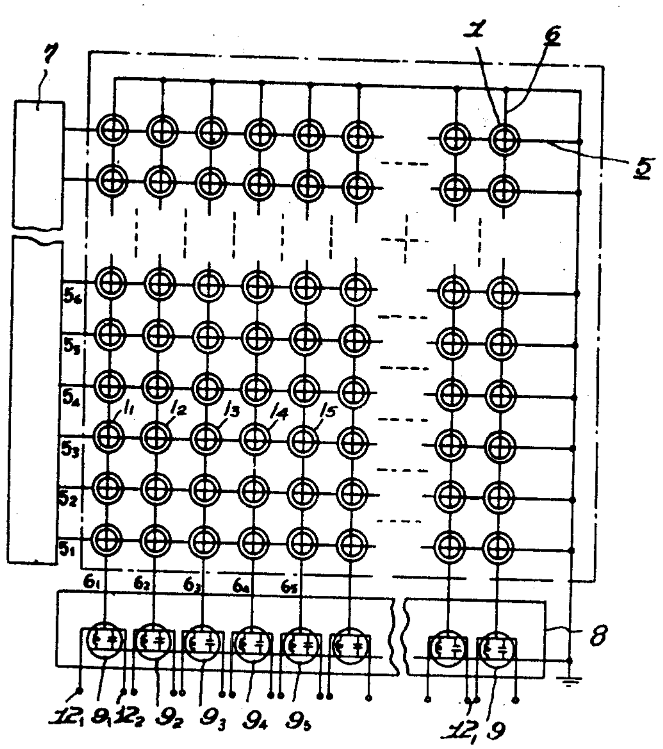
Figure 3 is a circuit diagram illustrating the apparatus to which is applied the system of the present invention.

In Figure 3, a plurality of magnetic cores are arranged in a matrix form and conductors 5 and 6 are so interlinked with the magnetic cores in the lines and columns, that at each cross-over point of said conductors 5 in the lines and said conductors 6 in the columns is formed one signal storage element.

The conductors 5 in the lines are electrically connected to the circuit selector 7 and the conductors 6 in the columns are electrically connected to the information signal source 8.

Figure 4:
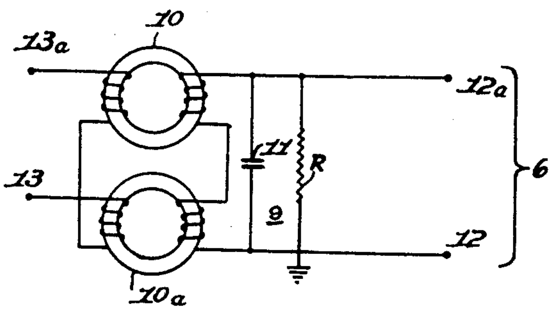
Figure 4 is a circuit diagram of one embodiment of a parametrically excited resonator to be used in the system of the present invention.

In case the digital memory apparatus is to be used for an electric computer, signal source 8 corresponds to a register of binary digits. This register 8 consists of parametrons 9. The number of parametrons being so selected as to be equal to the number of conductors 6. The detailed structure of each one of the parametrons 9 is shown in Figure 4. The parametron is composed of two toroidal magnetic cores 10 and 10$a$ which are made of ferro-magnetic material, two pairs of primary coils and two pairs of secondary coils, each pair of said primary and secondary coils being wound on each of said cores, the two primary coils being connected in series opposition, the two secondary coils being connected in series addition, and between the two secondary coils being parallelly connected a condenser 11.

Now, when the resonance frequency of the resonance circuit composed of said secondary coils and condenser 11 is about $f$ and a D.-C.-bias current and an exciting current having a frequency $2f$ is applied across the primary coils 13 and 13$a$, the resonance frequency of said resonance circuit varies with a frequency $2f$ due to the nonlinear characteristic of the cores 10 and 10$a$, and an oscillation wave having a frequency $f$ can be induced in the secondary resonance circuit. The phase of said oscillation wave takes either one of such two phases which differ about 180° each other as, for instance, 0 radian and $\pi$ radian. Now, when at the same time with or at a time slightly prior to the application of the exciting current having frequency $2f$ to the primary coils, to the secondary resonance circuit is applied a very weak input alternating current signal (phase control signal) having a phase nearly equal to 0 radian and having a frequency $f$, the phase of the oscillation wave becomes 0 radian. On the other hand, if the phase of the applied input signal current is about $\pi$ radian, the phase of the oscillation wave becomes $\pi$ radian.

The amplification factor of the parametron (which means the ratio: amplitude of the oscillation to amplitude of the phase control signal) can be made very large and about 40 $db$ of gain can be obtained very easily. In the circuit shown in Figure 4, one pair of terminals 12 and 12$a$ is used for both the input and output terminals depending on whether the exciting wave is impressed or not. Namely, when the exciting wave is not impressed, the parametron receives the phase controlling input signal from terminals 12 and 12$a$, and when the exciting wave is impressed, oscillation wave of the parametron is taken out of the same terminals. In order to simplify the drawings, the exciting circuits connected to the exciting terminals 13 and 13$a$ of the parametrons are not shown in other drawings, because they are not important in explaining the actions of the parametrons.

In the apparatus shown in Figure 3, each conductor 6 in each column is connected to the output terminals 12 and 12$a$, Fig. 4, of the respective parametron 9 as described above and the circuit selector 7 has a function to select any one of the conductors 5 in the lines and to supply said selected conductor with an alternating current having frequency $f/2$. The oscillation frequency and exciting frequency of said parametron and the frequency of the alternating current signal to be applied to the conductor 5 from the circuit selector 7 may be so selected as to be 1 mc., 2 mc. and 500 kc., respectively.

An illustration of the present invention in which a number consisting of several binary digits is recorded on the digital memory apparatus of Figure 3 will be described hereinafter. Now, to input terminals 12 and 12$a$ of each parametron 9 is applied an information input signal by a binary-phased control current having a frequency $f$ which is equal to that of the oscillation frequency of the parametron 9, in such a manner that 0 or 1 of each binary digit of the number is indicated in accordance with 0 radian or $\pi$ radian of the phase of said binary-phased control current. Accordingly, when the number to be recorded is taken as 00101, a binary-phased input signal of 0 radian is applied to the first, second and fourth parametrons $9_1$, $9_2$ and $9_4$ and a binary-phased input signal of $\pi$ radian is applied to the third and fifth parametrons $9_3$ and $9_5$. At the same time with or slightly later to the application of said input signals, an exciting current having frequency $2f$ is applied to each parametron to bring the same into oscillating state. As hereinbefore described, the oscillation phase of each parametron is controlled by the phase of each input signal, whereby the conductors 6 connected respectively to the output terminals of each parametron will be supplied with an amplified alternating current having the same frequency and the same binary phase as those of the input signal. When it is desired to record the number 00101 in the magnetic cores $1_1$, $1_2$, $1_3$, $1_4$ and $1_5$ located in the third line from the bottom of the matrix, it is necessary to select the conductor $5_3$ by means of the circuit selector 7 at the same time with the above-mentioned operation and supply the conductor $5_3$ with a recording signal current having a frequency $f/2$.

Figure 5:
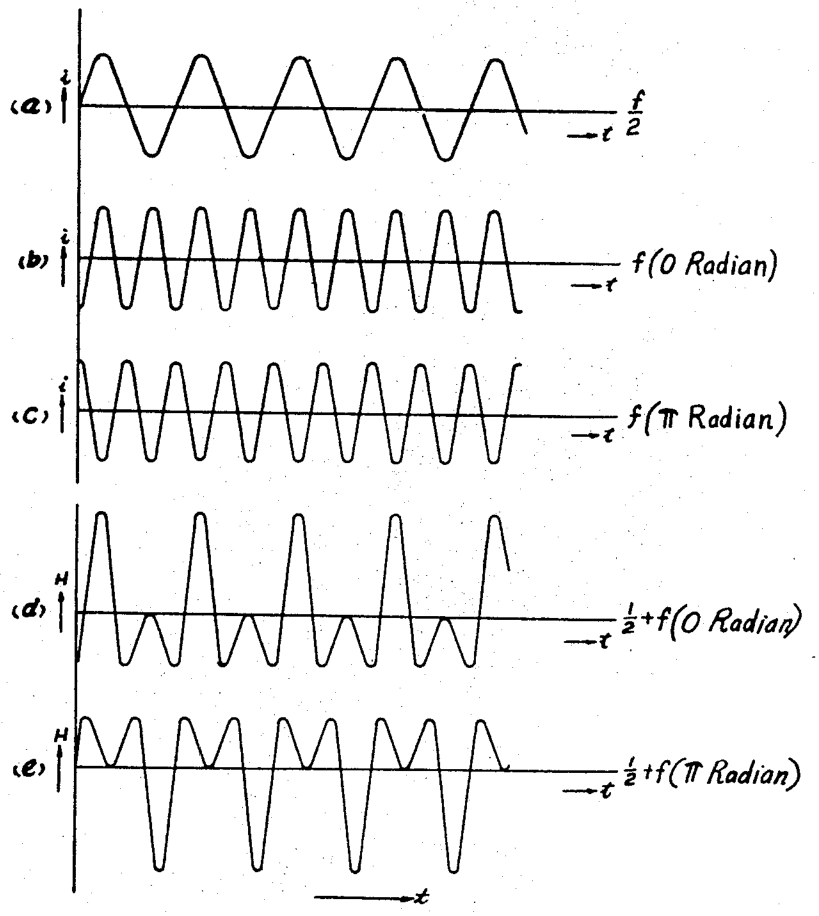
Figure 5 shows wave forms for describing the recording principle of the present invention.

As the circuit selector 7 may be an amplifying modulator of vacuum tube type or made of a group of parametrons which are parametrically oscillatory when it is excited with an alternating current frequency of $f$, the wave form of the recording signal current to be applied to the conductor $5_3$ from the circuit selector 7 has a constant phase and frequency $f/2$ as shown in Figure 5(*a*).

The binary-phased signal currents, being separately applied to the conductors 6 from the parametrons of register 8, have respectively one of the two wave forms shown in Figs. 5(*b*) and (*c*), in accordance with the phase. Figure 5(*b*) shows the wave form of a 0 radian signal and Figure 5(*c*) shows a $\pi$ radian signal. The phase of said recording signal is so adjusted that the phase of maximum amplitude of said recording signal substantially coincides with the phase of maximum amplitude of said binary-phased signal, as shown in Figure 5(*d*).

Now, for number 00101, the alternating current signal is applied to the conductors $6_1$, $6_2$ and $6_4$ in the first, second and fourth columns from left side has the phase shown in Fig. 5(*b*) and an alternating current signal having the phase shown in Figure 5(*c*) is applied to the conductors $6_3$ and $6_5$ in the third and fifth columns from left side, the magnetic cores $1_1$, $1_2$ and $1_4$ which are interlinked with the conductor $5_3$ will be supplied with two kinds of alternating current such as shown in Figures 5(*a*) and (*b*) and the magnetic cores $1_3$ and $1_5$ will be supplied with two kinds of the alternating currents such as shown in Figures 5(*a*) and (*c*). Accordingly, to the magnetic cores $1_1$, $1_2$ and $1_4$ are applied the magnetic fields having wave forms such as shown in Figure 5(*d*) and to the cores $1_3$ and $1_5$ are applied magnetic fields having wave forms as shown in Figure 5(*e*).

Now, let it be assumed that between the magnetic field intensity H and the magnetic induction B of the ferromagnetic cores 1, there is a hysteresis relation as shown in the curves $4_1$ and $4_2$ in Figure 2 and that the magnetic core $1_4$ was previously magnetized to the residual magnetic induction corresponding to the point 14 in Figure 2. Then, when there is applied the magnetic core $1_4$ a magnetic field having the wave form such as shown in Figure 5(*d*) by application of both the binary-phased signal current and the recording signal current, the magnetic induction of said core $1_4$ oscillates along the B–H curve shown by the enclosed curve 15 in Figure 2. Accordingly, when the application of the signal currents are ceased the magnetic core is restored to its residual magnetic induction corresponding to a point 14 or to the point near said point 14. On the other hand, if the magnetic core $1_4$ has been previously so magnetized as to maintain the magentic induction corresponding to the point 16 in Figure 2 and a recording signal current and binary-phased signal current are additionally applied thereto, the magnetic induction of said core successively ascends along the spiral curve 17 of Figure 2. And when both of said signal currents are terminated, core $1_4$ returns to the residual magnetic induction corresponding to the point 14 or to the point near said point 14 as same as the above-mentioned case.

As will be clearly understood from the above facts, the magnetic cores $1_1$, $1_2$ and $1_4$ to which are applied the magnetic fields as shown in Figure 5(*d*) will be given such magnetism as shown by the point 14 in Figure 2 regardless of the polarity of the residual magnetic induction which was previously given to said cores.

Similarly, the magnetic cores $1_3$ and $1_5$ to which have been applied the magnetic field as shown in Figure 5(*e*) will be given the residual magnetic induction corresponding to the point 16 in Figure 2. That is, the magnetic cores $1_1$, $1_2$, $1_3$, $1_4$ and $1_5$ coupled with the conductor $5_3$ which is supplied with a recording signal current from the circuit selector 7 will be given, respectively, the magnetisms corresponding to the points 14, 14, 16, 14 and 16 in Figure 2. Each of such polarities of the residual magnetic induction of said magnetic cores corresponds to the respective unit figure of the number 00101. During the above-mentioned recording process of the apparatus shown in Figure 3, taking into account that the parametrons other than each above-mentioned five parametrons $9_1$, $9_2$, $9_3$, $9_4$ and $9_5$ are not excited, the magnetic cores other than each above-mentioned five magnetic cores $1_1$, $1_2$, $1_3$, $1_4$ and $1_5$ are supplied with signal currents as follows:

The magnetic cores coupled with the conductors of the columns $6_1$, $6_2$, $6_3$, $6_4$, $6_5$ are supplied with the binary-phased signal currents having one of the wave forms shown in Figs. 5 and 5(*b*) and (*c*), the magnetic cores coupled with the conductor $5_3$ are supplied with the recording signal current having the wave form shown in Figure 5(*a*), and the remaining cores are not supplied with any current at all.

Since the wave forms of the above-mentioned currents are all symmetric with regard to zero level lines, no residual magnetic inductions can be recorded in the above-mentioned magnetic cores. Moreover, even if the above-mentioned signal currents were made very large so as to substantially demagnetize the induction, the polarity of the residual induction would not be changed, due to the symmetry of the wave form.

As it is clear from the above-mentioned facts, the recording process of a binary information into the magnetic induction thereof can be carried out only upon those magnetic cores, upon which both the recording signal current of frequency $f/2$ and the binary-phased signal current of frequency $f$ are supplied together, and polarities of the residual magnetic induction of the remaining cores are not changed.

Therefore, the above-mentioned recording method of the present invention have the following two advantages in comparison with the conventional method utilizing D.C. current pulses:

(1) The great margin value of currents. The proper value of the currents used in the recording process is not so critical.

(2) Correct recording of a binary information can be carried out even if the hysteresis curve of the magnetic cores are very different from strictly rectangular form.

In the following, the operation for reproducing the signal stored in the magnetic cores 1 illustrated in Figure 3 will be explained.

The following reproducing system can always be applied for the case in which the signals have been stored in the magnetic core or ferro-electric body having hysteresis character in accordance with positive or negative polarized polarity of said core or body. That is to say, there is no limitation in the system used for recording the signals to be reproduced.

However, when signal recording is to be carried out in accordance with the above system by means of using the circuit selectors 7 and register 8 comprising parametrons, these two apparatuses may also be utilized for the reproduction of the signal.

Let it be assumed that the number 00101 previously stored respectively in cores $1_1$, $1_2$, $1_3$, $1_4$ and $1_5$ is to be reproduced.

Now, the conductor $5_3$ is selected by the circuit selector 7, and a reproducing signal current which is an alternating current having frequency $f/2$ is supplied to said selected conductor. The reproducing signal current is a current as shown in Figure 6(*a*), and is completely equal to the recording signal current shown in Figure 5(*a*). Then magnetic inductions B of the magnetic cores $1_1$, $1_2$ and $1_4$ which have been magnetized to the point 14 in Figure 7 oscillate along the locus indicated by the enclosed curve 18 in said figure. Curve 18 has a flatter slope in positive part of magnetic field H and has a steeper slope in the negative part. Accordingly, in each of the conductors $6_1$, $6_2$ and $6_4$ which are coupled, respectively, with the magnetic cores $1_1$, $1_2$ and $1_4$ there is induced a distorted E.M.F. as shown in Figure 6(*b*).

The distorted E.M.F. contains the secondary harmonic component having the phase such as shown in Figure 6(*c*), that is, the E.M.F. having frequency $f$. On the other hand, the magnetic cores $1_3$ and $1_5$ are magnetized with a magnetism corresponding to the point 16 in Figure 7. Accordingly, in each of the conductors $6_3$ and $6_5$ coupled with said cores is induced another distorted E.M.F., (not shown), the second harmonic component of said E.M.F. having a reverse phase to that shown in Figure 6(*c*). The currents induced in the conductors 6 are applied to the parametrons 9 of the register 8 in Figure 3. As the parametrons form a resonance circuit having a tuning frequency near $f$, the above-mentioned harmonic components are selectively impressed on the parametrons.

Accordingly, when each of parametrons 9 is supplied with an exciting current having a frequency $2f$ at the same time with or at a time slightly later than the application of the reproducing signal current to the conductor $5_3$, the oscillation phase is controlled by the phase of the second harmonic component contained in the distorted E.M.F. which has been induced in the conductor 6. As the phase of the currents having frequency $f$ and induced in the conductors $6_1$, $6_2$ and $6_4$ is reverse to that of the current having frequency $f$ and induced in the conductors $6_3$ and $6_5$, the parametrons $9_1$, $9_2$ and $9_4$ generate an oscillation wave having a phase of 0 radian representing binary digit "0" and the parametrons $9_3$ and $9_5$ generate an oscillation having phase of $\pi$ radian representing binary digit "1," whereby the previously stored numbered 00101 is reproduced, and the output wave of said parametrons can be led out from the terminals 12 and 12*a* towards an arithmetic unit or any other unit at will.

The oscillation output currents of the parametrons 9 are not only taken out from the terminals 12 and 12*a*, but also flow into the conductors 6. Accordingly, the magnetic cores $1_1$, $1_2$, $1_3$, $1_4$ and $1_5$ are supplied with both the binary-phased oscillation output currents of the parametrons 9 through the conductors 6 and the reproducing signal current as shown in Figure 6(*a*) through the conductor $5_3$.

That is to say, the currents in the conductors 5 and 6 are entirely equal to the current such as shown in Figures 5(*a*), (*b*) or (*c*), said current having been used for recording the signal.

Therefore, a magnetic field having the wave form such as shown in Figures 5(*d*) or (*e*) is applied to the magnetic cores $1_1$, $1_2$, $1_3$, $1_4$ and $1_5$ and the number 00101 which was just reproduced is again recorded in the same cores or in other words a regeneration process is carried out quite automatically.

As is clear from the above descriptions, the above-mentioned reproducing method of the present invention is non-destructive, and no regenerating process is necessary. Therefore, the above-mentioned regeneration process is somewhat superfluous, but it is not a disadvantage because the process is carried out automatically without providing any special means for carrying it out.

The above-mentioned reproducing method of the present invention have the following advantages compared to the commonly used method utilizing D.C. current pulses:

(1) The non-destructive nature of reproduction process. No special means for regeneration are necessary.

(2) High signal to noise ratio. The reproducing signal, which is applied to the reactive storage elements in order to read out the polarity of the residual induction, has a different frequency $f/2$ from the frequency $f$ of the reproduced binary-phased signal. Therefore, these two signals can be completely separated by means of a filter and a high S/N ratio is obtained.

(3) Correct and reliable reproduction can be carried out even if the hysteresis curves of the reactive storage elements are very different from the strictly rectangular form.

It has been empirically shown that when a toroidal magnetic core having an inner diameter of 2 mm., outer diameter of 4 mm. and thickness of 1 mm. and made of copper-zinc ferrite, the hysteresis loop of said core being very different from rectangular form, was used, two alternating currents of 1 mc. and 500 kc. were used for recording. Even when the intensities of said currents were respectively varied between 200 ma. turn and 500 ma. turn, residual magnetic induction capable of being maintained for sufficiently long period of time was obtained. In the reproduction of the recorded signals, when a magnetic field between 300 ma. t./cm. and 500 ma. t./cm. was applied to said magnetic core by means of reproducing signal current of 500 kc., the second harmonic voltage of about 15 mv./turn was obtained. It was also confirmed that very effective and accurate operation can be obtained by using the apparatus shown in Figure 3, in which the above-mentioned-sized 1024 cores made of Cu-Zn-ferrite cores were arranged in a matrix form of 32 lines to 32 columns.

In Figure 8 is shown a digital memory apparatus in which ferro-electric capacitors having hysteresis loop characteristics are used as the reactive storage elements.

Single crystal of plate form made of barium titanite is very suitable for said object. Of course, many other ferro-electric body capable of producing residual electric induction may be used as said material. In Figure 2, if the magnetic field intensity H and the magnetic induction B are, respectively, substituted by electric field intensity E and electric induction D, the above-mentioned ferro-electric substance has a hysteresis character similar to that shown by the curves $4_1$ and $4_2$ in Fig. 2. The closer the hysteresis loop approaches a rectangular form, the more accurate operation will be obtained, but according to the present invention a sufficiently practical operation can be attained even when said hysteresis loop differs remarkably from the rectangular form.

The digital memory apparatus shown in Figure 8 is composed of a crystal plate made of barium titanate and parallelly arranged conducting tapes 5 and 6 which cross perpendicular to each other and which are arranged, respectively, on both surfaces of said crystal plate, said tapes 5 being attached on one surface of said crystal plate and being connected to the circuit selector 7, and also the other parallel tapes 6 being used as the information signal source for the recording operation and being connected to the parametrons 9 in the register 8 which operates as an amplifier.

Each of the cross parts between the conductors 5 and 6 forms a condenser 21 having ferro-electric substance made of barium titanite. This condenser is used as the unit reactive storage element.

A detailed operational description in connection with the above-mentioned digital memory apparatus is omitted herein, because said description is equal to the operational description relating to the case in which magnetic cores are used as the reactive storage elements except that the waves shown in Figures 5(*a*), (*b*) and (*c*) and Figures 6(*a*), (*b*) and (*c*) are substituted with voltage waves and the waves in Figures 5(*d*) and (*e*) and Figure 6(*d*) are substituted with the wave of electric fields.

In the above-mentioned recording system, let it be assumed that a certain constant phase is given to the current or voltage having a frequency of $f/2$ and the phase of the current or voltage having a frequency $f$ is shifted by 180° in accordance with the information signal. However, reversely, it may be possible to use the current or voltage having a frequency $f/2$ as the information signal and to use the current or voltage having frequency of $f$ as the recording signal. Of course, in said case it is necessary to shift the phase of the current or voltage having a frequency $f/2$ by 90° in accordance with the information signal.

In the following will be described another system in which signals can be recorded in such reactive storage elements as described already by utilizing the current or voltage having binary phases.

Referring to Figure 9, another memory system is shown employing one hundred magnetic cores arranged in the matrix form composed of ten lines and ten columns and the conductors 5 and 6 which are, respectively, coupled with the magnetic cores in lines and columns and connected to the circuit selectors 22 and 23, respectively. The conductor 25 connected to the information signal source 24 is coupled with all of the hundred magnetic cores.

The signal source 24 comprises a parametron which oscillate to generate an alternating current having a frequency $f_1$ phase and which can shift its phase by 180° in accordance with the input information signal, so that in the recording operation an alternating current having a frequency $f_1$ will be applied to said conductor 25, the phase of said current being 0 radian or $\pi$ radian. On the other hand, when any signal is to be recorded in one magnetic core $1_6$, conductors $5_4$ and $6_6$ are selected by the circuit selectors 22 and 23 and then to these conductors are applied recording signal currents having frequencies $f_2$ and $f_3$, respectively, but in this case it is necessary to maintain the relation $f_2-f_3=f_1$ between the frequencies $f_2$ and $f_3$.

Figures 10(*a*) and (*b*) illustrate the waves of the binary-phased information signal currents which are to be applied to the conductor 25.

As described above, there is a phase difference of 180° between the waves (*a*) and (*b*).

Let it be assumed that to the magnetic core $1_6$ is applied a binary-phased information signal current such as shown in Figures 10(*a*) or (*b*) as well as the alternating currents having frequencies $f_2$ and $f_3$ through the conductors $5_4$ and $6_6$. Then, the magnetic fields generated in the magnetic core $1_6$ by said two kinds of alternating currents interfere with each other, thereby a resultant magnetic field having a pulsative form such as shown in Figure 10(*c*) will be obtained. To this pulsating magnetic field is superposed a magnetic field caused by the information signal current which is applied to the conductor 25, the frequency $f_1$ of said information signal current being equal to the frequency $(f_2-f_3)$ of the pulsating wave due to the interference between the two alternating currents having frequencies $f_2$ and $f_3$, respectively. Therefore, if the apparatus is so adjusted that the phase of the maximum amplitude of the pulsating wave as shown in Figure 10(*c*) coincides with the phase of the minimum amplitude of the magnetic field due to such information signal current as shown in Figure 10(*a*), the resultant wave of the two pulsating magnetic fields will assume the form shown in Figure 10(*d*). Furthermore, if the information signal current takes the phase such as shown in Figure 10(*b*), said resultant wave assumes the form shown in Figure 10(*e*). As is clearly shown in said drawing, the above-mentioned two kinds of the resultant magnetic fields are not same in their positive and negative amplitudes.

That is to say, when the information signal current takes the phases such as shown in Figure 10(*a*), the negative amplitude is larger than the positive amplitude and when said current assumes the phase such as shown in Figure 10(*b*), the positive amplitude is larger than the negative amplitude.

On the other hand, when amplitudes of the currents applied, respectively, to the conductors $5_4$ and $6_6$ are same and the amplitude of the information signal current applied to the conductor 25 is double the former amplitude, the negative or positive amplitude of such pulsating magnetic field as shown in Figures 10(*d*) and (*e*) will become respectively twice the positive or negative amplitude. Accordingly, if the magnetic core $1_6$ having a magnetic induction corresponding to the point 16 in Figure 11 is additionally applied with such magnetic field as shown in Figure 11(*e*), its magnetic induction rises along the spiral locus 26 shown in Figure 11 like the case described in connection with Figure 2. After the recording operation is completed and the currents in the conductors $5_4$ and $6_6$ are terminated, the magnetic core assumes the magnetic induction corresponding to the point 14. On the other hand, when said magnetic induction corresponding to the point 14 is previously given to the magnetic core $1_6$, the magnetic induction of said core pulsates merely along the enclosed curve 27 shown in Figure 11, so that said core retains the magnetic induction corresponding to or near the point 14 even when the currents in the above conductors are disconnected. If the magnetic core $1_6$ is impressed with the magnetic field such as shown by Figure 10(*d*), the magnetic core $1_6$ will retain the magnetic induction corresponding to or near the point 16 in Figure 11.

The other magnetic core coupled with the conductor $5_4$ is excited by both the current having a frequency $f_2$ and the current having a frequency $f_1$. Similarly, the other magnetic core coupled with the conductor $6_6$ is excited by both the current having a frequency $f_3$ and the current having a frequency $f_1$. However, the positive and negative amplitudes of the resultant magnetic field caused by two kinds of said currents are alike unless the fact that the difference between said two frequencies is relatively little and there is no integral ratio between said two frequencies.

All of the other magnetic cores except magnetic core $1_6$ and the above-mentioned two kinds of the magnetic cores are excited by only the current having frequency of $f_1$ and flowing in the conductor 25. Accordingly, all of the other magnetic cores except the magnetic core $1_6$ can not be recorded at all and can not be varied in their previously applied magnetic induction.

For the reproduction of the signals recorded in the reactive storage elements such as shown in Figure 9, any suitable means may be adopted. However, for the simplification of the apparatus may be preferably used the system in which, like the recording case, any one conductor is selected by the circuit selectors 22 and 23 and this selected conductor is applied with reproducing signal currents having the frequencies $f_2$ and $f_3$. In this case, since in the magnetic cores coupled with the above-mentioned two conductors is induced a pulsating magnetic field having a frequency $(f_2-f_3)$, E.M.F. having a frequency of $(f_2-f_3)$ will be superposed in the E.M.F. induced in the conductor 25.

The positive or negative amplitude of the last-mentioned current becomes larger than the negative or positive amplitude thereof in accordance with the magnetization polarity of the magnetic core. That is to say, the phase of the E.M.F. component having a frequency of $(f_2-f_3=f_1)$ contained in the E.M.F. which has been induced in the conductor 25 shifts by 180° in accordance with the stored signals of the magnetic core. Accordingly, it is possible to amplify the output information signal induced in the conductor 25 by means of using a parametron as the information source 24. A part of the oscillation current which has been amplified by said parametron flows through the conductor 25, so that said current can carry out any signal recording operation by cooperation with the reproducing signal currents in the conductors 5 and 6.

The apparatus shown in Figure 12 is a modification of the apparatus shown in Figure 9, but in the former is used ferro-electric bodies having hysteresis characteristics as the storage elements. In said apparatus, the electric conductors (tapes) 5 and 6 and the storage element 21 are same with those described in connection with the apparatus in Figure 8.

In the apparatus shown in Figure 12, the output information current from the signal source 33 which corresponds to the information signal source 24 in Figure 9, is supplied to the circuit selectors 28 and 29 and then superposed to the currents having the frequencies $f_2$ and $f_3$ which are supplied to the conductors 5 and 6.

In the apparatus shown in Figure 12, the reactive storage element 21 may be substituted by such magnetic core element as shown in Figure 1.

The systems illustrated in Figures 9 and 12 and employing three kinds of currents are particularly effective for the case in which the form of hysteresis loop of the storage element is nearly same with a rectangular form and for serial type computer in which recording and reproducing speeds are relatively low.

As described above in connection with the embodiments, the present invention relates to a digital memory system in which reactive storage element having hysteresis characteristics is used as the unit storage element, information recording is carried out by giving magnetic residual induction or electric residual induction corresponding to the binary information to said element by means of applying an information signal of binary phases and a certain recording signal having constant phase and frequency to said element. In the reproduction of the stored signal in said system a certain alternating current is applied to the element having the information signal stored by said residual induction and the second harmonic current the phase of which shifts by 180° in accordance with said residual induction is induced in said element, whereby the stored signal is reproduced.

Therefore, according to the digital memory system of the present invention, it is possible to carry out a recording operation by directly applying the output information signals of the parametron to the reactive storage element or to carry out control of the oscillation phase of the parametron by directly applying the reproduced output information signals to said parametron. Consequently, when the system of the present invention is applied to any electric digital computer which utilizes parametrons, very simple apparatus will be obtained. However, by use of apparatus capable of converting a direct current impulse signal into an alternating current of binary phase and by use of apparatus capable of converting said current into direct current signal, the system of the present invention may be utilized for the digital computer or other various apparatuses.

The original point in the hysteresis loop characteristic of the residual induction has a symmetrical character. On the other hand, in the system of the present invention signal storing is carried out directly in accordance with the polarity of the residual induction without storing the information signals in accordance with the magnitude of the polarized residual induction.

In summary, it will be apparent to one skilled in the art to which the instant invention relates that a binary memory system has been disclosed employing reactive storage elements which do not rely on a rectangular hysteresis loop characteristic for successful operation, but relies on whether the residual point 14 or 16 of the hysteresis loops of Figs. 2, 7, and 11 are above or beneath the origin point 0. It will also be apparent that by employing this principle, memory operations can be performed even when the residual inductance is less than the magnetizing force corresponding to the saturation point.

Accordingly, it is possible to store the binary information in the perfectly symmetrical form, so that reproduction will be effectively attained so long as the polarity can be distinguished even when the residual induction attenuates.

Obviously many modifications and variations of the instant invention are possible in the light of the above teachings. It is to be understood therefore that within the scope of the appended claims the invention may be practiced otherwise than as specifically described.

What is claimed is:

1. In a binary digit information storage system, the combination, comprising a plurality of nonlinear circuit elements, each having a hysteresis loop relationship between the electro-magnetic field applied thereupon and the electromagnetic induction thereof, and being capable of storing one binary digit in accordance with the polarity of the electro-magnetic residual induction thereof; at least one parametrically excited resonator coupled electrically with said nonlinear circuit elements, the reactance of said resonator being varied at about twice the resonant frequency of said resonator, said resonator generating a ½ subharmonic oscillation of the parametric oscillation, and the binary digit to be recorded being represented by the phase difference of said parametric oscillation; means for applying to said nonlinear circuit elements at least one A.C. recording signals having a constant phase and constant frequency, said frequency being different from the oscillating frequency of said resonator; and means for recording the electro-magnetic residual induction in said nonlinear circuit elements in a manner that the binary information stored in said nonlinear circuit elements is reproduced in accordance with the oscillation phase of said resonator by application of a component wave to said resonator for controlling the oscillation phase thereof, said applied wave having a frequency equal to the oscillation frequency of said resonator and shifted in phase by 180° in accordance with the polarity of the residual induction, and said wave being generated when said A.C. recording signal alone is impressed upon said nonlinear circuit element.

2. A digital storage device comprising a plurality of nonlinear reactors each having an hysteresis characteristic related to the electromagnetic field supplied thereto and each storing one binary digit in accordance with the polarity of the electromagnetic residual induction thereof, a source of information signals having a frequency $f$, means for connecting each of said reactors with said source of information signals, a source of auxiliary signal energy having a frequency different from the frequency $f$ of the information signals, means for connecting each of said reactors with said source of auxiliary signals, the input of the information into each said reactor being effected by applying two signals to each reactor, one of the signals being the said information signal having its phase modulated by substantially 180° in accordance with the digit to be stored and the other signal being the auxiliary signal having constant phase, said source of information signals including a source of exciting energy of frequency $2f$, a source of weak control signal energy of frequency $f$, and an output resonant circuit having a substantially resonant frequency $f$ and including means for varying its resonance frequency, means to connect said source of exciting energy to said output resonant circuit through said resonance varying means, and means to connect said source of weak control signal energy to said output resonant circuit whereby an oscillation of frequency $f$ is generated in said resonant circuit and the phase of said oscillation is controlled by the phase of the weak control signal when the generated oscillation is restarted after interruption.

3. The invention as set forth in claim 2, wherein the auxiliary signal energy has a frequency of $f/2$.

4. The invention as set forth in claim 2, wherein the auxiliary signal energy comprises two sinusoidal A.C. waves, the beat frequency between the waves being equal to the said frequency $f$.

5. A digital storage device as claimed in claim 2, in which said plurality of nonlinear reactors are arranged in a matrix form, said means for electrically connecting each of said nonlinear reactors with a source of information signal comprises column conductors, and said means for electrically connecting each of said nonlinear reactors with a source of auxiliary A.C. signal comprises line conductors, whereby selection is effected by energizing a selected line conductor and a selected column conductor.

6. A digital storage device as recited in claim 2, wherein the said nonlinear reactors comprise ferromagnetic cores.

7. A digital storage device as recited in claim 2, wherein the said nonlinear reactors comprise ferroelectric capacitors.

8. A digital storage device comprising a plurality of nonlinear reactors each having an hysteresis characteristic related to the electromagnetic field supplied thereto and each storing one binary digit in accordance with the polarity of the electromagnetic residual induction thereof, a source of information signals having a frequency $f$, means for electrically connecting each of said nonlinear reactors with said source of information signals, and means connecting each of said reactors with a source of auxiliary A.C. signals having a frequency different from that of the information signal frequency $f$, the recording of the information into each of said reactors being effected by applying the two signals to each of said reactors, one signal being the information signal the phase of which is modulated by substantially 180° in accordance with the binary digit to be stored and the other of the signals being the auxiliary signal having constant phase, and in which the reproducing of information from each of said reactors is effected by discriminating the phase of the component voltage of frequency $f$ generated in the reactors by applying the auxiliary signal thereto, an output resonant circuit in said source of information signals, the discrimination of phase being effected by applying the voltage component of frequency $f$ to said output resonant circuit in the source of information signals as the weak control signal whereby the phase of oscillation resulting in the output resonant circuit is controlled by the stored information and the resonant circuit supplies the recording signal and the amplification of the output signal, the said source of information signals comprising an input exciting circuit for applying an exciting wave of frequency $2f$, means for applying a weak control signal input of frequency $f$, said output resonant circuit having a substantially resonant frequency $f$ and having means for varying the resonant frequency thereof, said input exciting circuit connected to said output resonant circuit through said means for varying the resonant frequency, and said weak control signal input being applied directly to said output resonant circuit whereby an oscillation of frequency $f$ is generated in the resonant circuit and the phase thereof is controlled by the phase of the weak control signal when said generated oscillation is restarted after interruption.

9. A digital storage device as claimed in claim 8, in which the auxiliary signal has a frequency of $f/2$.

10. A digital storage device as claimed in claim 8, in which said auxiliary signal comprises two sinusoidal waves having a beat frequency equal to $f$.

11. A digital storage device as claimed in claim 8, in which said plurality of nonlinear reactors are arranged in matrix form, said means for electrically connecting each of said nonlinear reactors with a source of information signal comprises a series of column conductors, and said means for electrically connecting each of said nonlinear reactors with a source of auxiliary A.C. signal comprises a series of line conductors, whereby address selection is effected by selectively energizing one line conductor and one column conductor.

12. A digital storage device as claimed in claim 8, in which said reactors are wired ferromagnetic cores.

13. A digital storage device as claimed in claim 8, in which said reactors are ferroelectric capacitors.

References Cited in the file of this patent

UNITED STATES PATENTS

| | | |
|---|---|---|
| 2,574,438 | Rossi | Nov. 6, 1951 |
| 2,614,167 | Kamm | Oct. 14, 1952 |
| 2,697,825 | Lord | Dec. 21, 1954 |
| 2,721,947 | Isborn | Oct. 25, 1955 |
| 2,770,739 | Grayson | Nov. 13, 1956 |
| 2,783,456 | Steagall | Feb. 26, 1957 |
| 2,845,611 | Williams | July 29, 1958 |

OTHER REFERENCES

"A Radio-Frequency Nondestructive Readout For Magnetic Core Memories" (Widrow) IRE Transactions, December 1954, pp. 12 to 15.